Jan. 24, 1967  E. B. HEDGEPETH  3,300,111
BUMPER MOUNTS FOR CARRYING LOADS IMPOSED ABOVE VEHICLES
Filed Jan. 29, 1965

INVENTOR.
EDWARD B. HEDGEPETH
BY M. Ralph Shaffer
HIS ATTORNEY

United States Patent Office 3,300,111
Patented Jan. 24, 1967

3,300,111
BUMPER MOUNTS FOR CARRYING LOADS
IMPOSED ABOVE VEHICLES
Edward B. Hedgepeth, 432 East 2700 South, Apt. 38,
Salt Lake City, Utah 84104
Filed Jan. 29, 1965, Ser. No. 428,974
8 Claims. (Cl. 224—42.07)

The present invention relates to bumper mounts for vehicles and, more particularly, to a new and improved bumper mount which is readily attachable to and removable from the rear bumper, for example, of vehicles where the latter are to carry loads supported thereabove.

In the past a number of different types of bumper mounts have been devised for vehicles carrying bumper support loads. Some installations are more or less permanent and they require the drilling of holes through the bumper in order to accommodate the structure. Other types of bumper mounts simply are clamping mechanisms which have proven somewhat deficient in sustained operation since they impose too great a twisting moment upon the bumper; further, the clamp will tend to slip and malfunction through increased wear.

Accordingly, the object of the present invention is to provide a new and improved bumper mount which is conveniently installable and removable from a conventional rear bumper, for example, of vehicles.

A further object is to provide a new and improved, releasably installed bumper mount to assist in the carrying of loads disposed above a vehicle to be imposed upon a vehicle's rear bumper, for example.

An additional object of the invention is to provide a new and improved bumper mount wherein the same may conveniently include a hooking means and mounting member, integrated with the supported structure, so that the bumper mount "hangs" on the bumper.

An additional object is to provide a bumper-mounting structure which is ideally suited for accommodating jacked-up structures, this in such a manner that the pin or body of the mount may be pre-hooked over the bumper and pivotally raised into certain bifurcated structure in the mount, this so that the same may be easily secured together by a single user.

An additional object is to provide a safety chain feature for a bumper mount of the bumper-hooking type wherein the slightest possible chance of slippage of the mount is avoided.

A further object is to provide a jackknife type of cooperation between the saddle and a pivotable body of a mount so that convenient and ready installation and removal of the mount from the bumper may be had.

The features of the present invention which are believed to be novel are set forth with particularity in the appended claims. The present invention, both as to its organization and manner of operation, together with further objects and advantages thereof, may best be understood by reference to the following description, taken in connection with the accompanying drawing in which:

Figure 1:
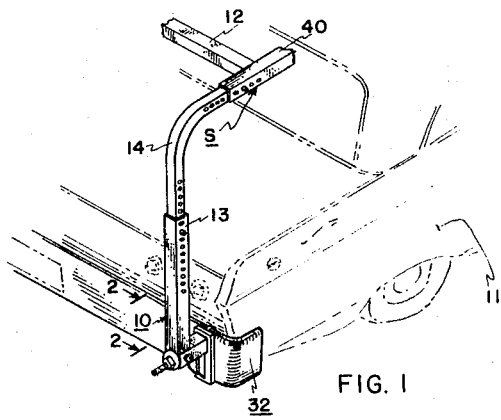
FIGURE 1 is a fragmentary, perspective view of a vehicle provided with a bumper mount according to the present invention, this for the purpose of supporting a load to be imposed over the vehicle and suported by the rear bumper.

In FIGURE 1 the bumper mount of the present invention is shown at 10. Bumper mount 10 is a releasable attachment for releasably securing structure to the rear bumper, for example, of a vehicle. The purpose of the bumper mount is to serve as a load-carrying member, when attached to the bumper, for a load supported above the top surface of a vehicle 11 of any general kind. Frame structure 12 may be conventional, and the bumper mount 10 may be designed as including an upstanding receptacle 13 for the reception of and support of upstanding load-bearing member 14.

Figure 4:
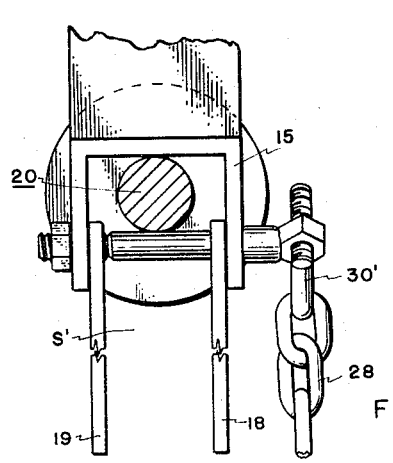
FIGURE 4 is a fragmentary, partially sectioned view of the structures of FIGURES 2 and 3 and is taken along the line 4—4 in FIGURE 2, with the cushion or pad of the structure shown removed.
Figure 3:
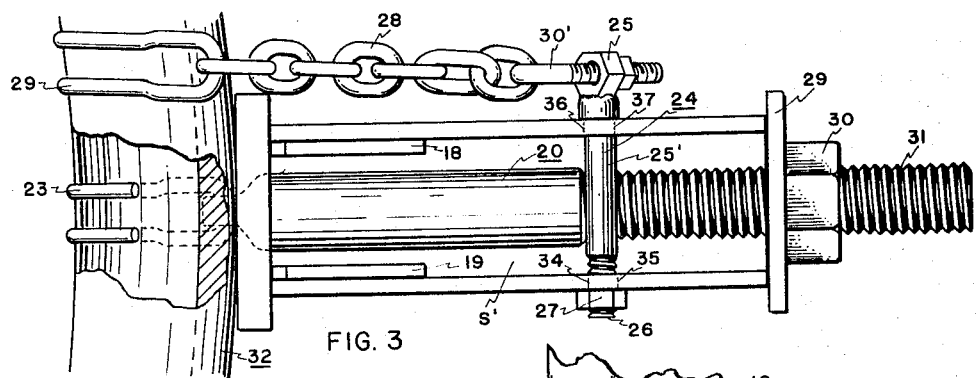
FIGURE 3 is a bottom plan of the structure of FIGURE 2.
Figure 2:
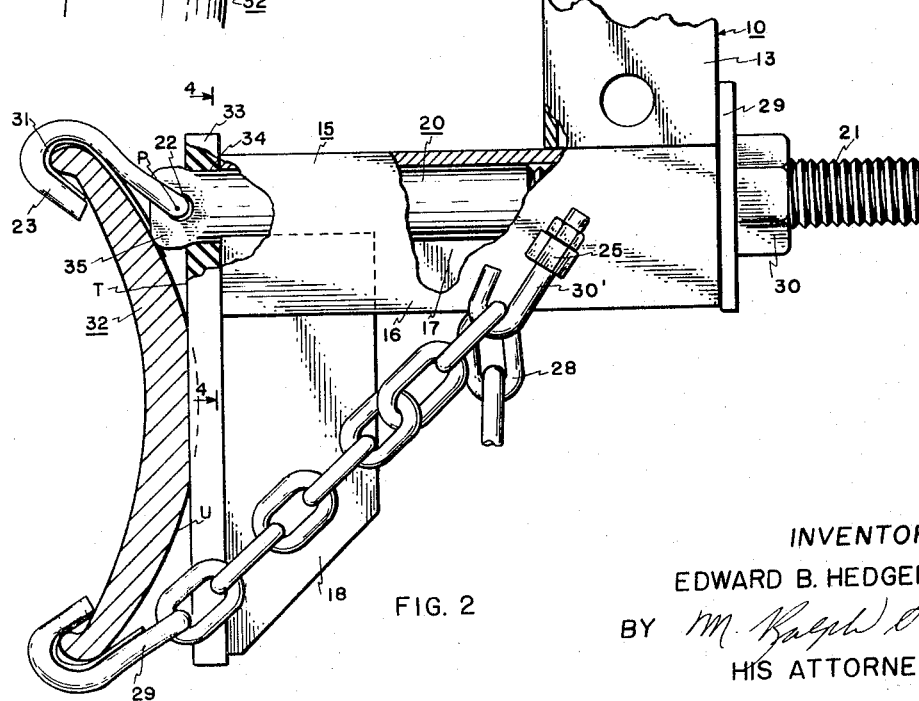
FIGURE 2 is enlarged, partially broken away, and sectioned elevation taken along the line 2—2 in FIGURE 1.

The bumper mount 10 of the present invention is shown in enlarged view, and is partially sectioned, in FIGURE 2. In particular, mount 10 includes an inverted, U-configured saddle member 15. To the depending sides 16 and 17 of the saddle member 15 are welded or otherwise affixed respective, depending support legs 18 and 19. As seen in FIGURES 3 and 4, these support legs are nominally vertically aligned and mutually horizontally spaced.

Elongate pin or body 20 is geenrally pin-configured, preferably includes a threaded end portion 21, and also includes an eye aperture 22 configured for the reception of double hook member 23.

Pin 24 includes a threaded head 25, such as a nut, and a threaded end portion 26 at the opposite extremity thereof for the reception of nut 27. Safety chain 28 is provided with lower hook member 29, and hook 30' attaches thereto and is secured to the threaded head 25 of pin 24. Head 25 may simply comprise a nut, as before mentioned, which is welded or otherwise secured to the principal portion 25' of pin 24. Washer 29 and nut 30 are threaded onto the threaded end portion 21 of body 20 to secure the structure in position. If desired, a pad 31 may be disposed between the hook member 23 and bumper 32, this to protect the latter against inadvertent scratches.

To complete the structure, a bumper pad or cushion 33 is provided. The latter includes an aperture 34 through which the pin or body 20 can pass rearwardly. It has been found convenient to enlarge the head 25 of pin or body 20 to prevent the cushion 33 from slipping thereover. In fabrication it is preferable that the cushion be made of a tire section, for example, with the tread thereof being disposed at T. Of course, other types of cushions are possible. However, there have been proven definite advantages in the use, in the present invention of nylon-reinforced tire sections.

Assume, merely by way of example that the structure at S, including cross-brace 12, in FIGURE 1 is mounted upon jacks, see the inventor's Patent No. 3,160,434. The driver will first hook the hook member 23 over the upper edge of the bumper and allow the pin or body 20 to depend therefrom. Thus, it will now be convenient for the driver of the vehicle 11 to back up his car rearwardly so that his rear bumper will be proximate the upright 13. Now while, preferably, the upright member 13 will be welded or otherwise affixed to member 15, yet such need not necessarily be the case. Other types of attachment can be used.

Subsequently, after the vehicle is parked in the right position immediately over upstanding member 13, then the body 12 is upwardly lifted, i.e. pivoted about P of the hook member 23, so that the same falls within slot S' as provided between depending support legs 18 and 19 and the slides 16 and 17 of U-configured saddle member 15. Then pin 24 will be installed immediately under the body or king pin 20, this through the apertures 34 and 35, 36 and 37, which are supplied in the sides 16 and 17 of saddle member 15.

The washer 29 and nut 30 are next installed as indicated in FIGURE 2 and are tightened down so that the load carried by the upper lip of rear bumper will be further stabilized through the thrusting of members 18 and 19 bumper surface thereof through cushion 33.

When nut 30 has been sufficiently tightened, then the user will simply install as a safety feature the hook 29 with its chain 28, the same being secured to hook 30' in a manner as indicated in FIGURE 2.

Particular emphasis is to be made of the distinguishing features of the present bumper mount when compared with those of prior bumper mounts. Bumper clamps in general are common, but these universally tend to rely for clamping effectiveness upon the rigidity of the vehicle frame and of the bumper thereof, and tend to twist the bumper from its frame mount. The present bumper mount, in contrast, relies for its rigidity upon the support frame it carries, i.e. at S. Indeed, members 10, 15, 18, and 19 are to be considered as a part of the support frame maintained over the vehicle, with the leftward vertical edges of members 18 and 19 being simply pressed toward the rear surface of bumper 32 through the tightening of nut 30 upon threaded end portion 21. The bumper mount, thus, merely "hangs" on bumper 32 via hook member 23. Hence, no tendency is present to twist the bumper off its frame mounting or to twist the vehicle frame.

Conceivably, the depending legs could be eliminated since the bumper mount merely "hangs" from the top edge of the bumper and the tightening of nut 30 clamps the bumper between hook 23 and head 35 of body or pin 20. However, it has been proven that the provision of support legs 18 and 19 and cushion 33 do further tend to add a cushioned, reaction-type of overall stability to the structure.

There are several constructions that are possible as to the support structure. Thus, the frame supported by the structure may include a telescopic mount 40 to which the L-configured upstanding member 14 may be pinned and supporting member 13 likewise pinned to the latter.

If desired, the pad 31 may be included to prevent scratching of the bumper surface by hook member 23.

What has been provided, therefore, is a releasable bumper mount for vehicles carrying loads to be supported thereby and, in particular, a mount that can be easily assembled and disassembled, conveniently removed from the bumper, and yet sufficiently sturdy to take virtually all types of anticipated stress and load to be imposed thereon.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A bumper mount for supporting a load thereabove, said bumper mount including, in combination, hook means for hooking over the top edge of an external vehicle bumper, an elongate body member pivotally secured to said hook means, a saddle member constructed for disposition over said elongate body member, said saddle member having depending reaction means for thrusting against said bumper under the loading of said elongate body member, pin means disposed transversely through said saddle member and under said elongate body member for locking said elongate body member in place within said saddle member, cushioning means disposed between said bumper and said reaction means, means for securing external load-carrying means affixed to said saddle member, and means connected to said body member, in engagement with the rear of said saddle member, and reacting against said saddle member for tension loading said elongate body member and thereby thrusting said saddle member toward said bumper.

2. A bumper mount for supporting a load thereabove, said bumper mount including, in combination, hook means for hooking over the top edge of an external vehicle bumper, an elongate body member pivotally secured to said hook means, a saddle member constructed for disposition over said elongate body member, said saddle member having depending reaction means for thrusting against said bumper under the loading of said elongate body member, pin means disposed transversely through said saddle member and under said elongate body member for locking said elongate body member in place within said saddle member, cushioning means disposed between said bumper and said reaction means, means for securing external load-carrying means affixed to said saddle member, and means connected to said body member, in engagement with the rear of said saddle member, and reacting against said saddle member for tension loading said elongate body member and thereby thrusting said saddle member toward said bumper, and wherein said bumper mount includes additional hook means for hooking under the bottom of said bumper, elongate means affixed to said additional hook means, and tension means engaging said pin means for tensioning said elongate means.

3. A bumper mount for supporting a load thereabove, said bumper mount including, in combination, hook means for hooking over the top edge of an external vehicle bumper, an elongate body member pivotally secured to said hook means, a saddle member constructed for disposition over said elongate body member, said saddle member having depending reaction means for thrusting against said bumper under the loading of said elongate body member, pin means disposed transversely through said saddle member and under said elongate body member for locking said elongate body member in place within said saddle member, cushioning means disposed between said bumper and said reaction means, means for securing external load-carrying means affixed to said saddle member, and means connected to said body member, in engagement with the rear of said saddle member, and reacting against said saddle member for tension loading said elongate body member and thereby thrusting said saddle member toward said bumper, and wherein said bumper mount includes additional hook means for hooking under the bottom of said bumper, elongate means affixed to said additional hook means, and tension means engaging said pin means for tensioning said elongate means, and wherein said tension means includes a threaded hook means, said pin means including a head provided with an aperture, said aperture receiving said threaded hook means, and nut means for tightening said hook means and said elongate means to which it is connected.

4. Structure according to claim 1 wherein said reaction means comprises depending leg means mutually spaced apart for thrusting against said bumper.

5. A bumper mount for supporting a load thereabove, said bumper mount including, in combination, hook means for hooking over the top edge of an external vehicle bumper, an elongate body member secured to said hook means, a saddle member constructed for disposition over said elongate body member, said saddle member having depending reaction means for thrusting against said bumper under the loading of said elongate body member, pin means disposed transversely through said saddle member and under said elongate body member for locking said elongate body member in place within said saddle member, cushioning means disposed between said bumper and said reaction means, means for securing external load-carrying means affixed to said saddle member, and means connected to said body member, in engagement with the rear of said saddle member, and reacting against said saddle member for tension loading said elongate body member and thereby thrusting said saddle member toward said bumper.

6. Structure according to claim 1 wherein said elongate body member includes a rearward threaded end portion, said reacting means comprising nut means threaded onto said threaded end portion.

7. A bumper mount for supporting a load thereabove, said bumper mount including, in combination, hook means for hooking over the top edge of an external vehicle bumper, an elongate body member pivotally secured to said hook means, a saddle member constructed for disposition over said elongate body member, said saddle member having depending reaction means for thrusting against said bumper under the loading of said elongate body member, pin means disposed transversely through said saddle member and under said elongate body member for locking said elongate body member in place within said saddle member, means for securing external load-carrying means affixed to said saddle member, and means connected to said body member, in engagement with the rear of said saddle member, and reacting against said saddle member for tension loading said elongate body member and thereby thrusting said saddle member toward said bumper.

8. Structure according to claim 7 wherein said bumper mount includes a cushion member provided with an aperture and constructed for disposition between said bumper and said rigid member, one of said body means and said hook means being disposed through said aperture.

References Cited by the Examiner

UNITED STATES PATENTS

| | | | |
|---|---|---|---|
| 2,791,445 | 5/1957 | Wanamaker | 280—502 |
| 2,884,260 | 4/1959 | Polstra | 280—502 |
| 3,100,241 | 8/1963 | Goldstein | 224—42.03 |

GERALD M. FORLENZA, *Primary Examiner.*

J. E. OLDS, *Assistant Examiner.*